United States Patent
Loos et al.

(10) Patent No.: US 6,305,490 B1
(45) Date of Patent: Oct. 23, 2001

(54) STEERING VALVE ARRANGEMENT OF A HYDRAULIC STEERING SYSTEM

(75) Inventors: Hendrik Loos, Esslingen; Martin Rothmund, Weil der Stadt; Bernd Schiek, Winterbach; Hubert Bohner, Boeblingen, all of (DE)

(73) Assignees: DaimlerChrysler AG, Stuttgart; Mercedes-Benz Lenkungen GmbH, Duesseldorf, both of (DE)

( * ) Notice: Subject to any disclaimer, the term of this patent is extended or adjusted under 35 U.S.C. 154(b) by 0 days.

(21) Appl. No.: 09/389,479

(22) Filed: Sep. 3, 1999

(30) Foreign Application Priority Data

Sep. 5, 1998 (DE) .............................. 198 40 625

(51) Int. Cl.[7] ...................................................... B62D 5/08
(52) U.S. Cl. ............................................................ 180/441
(58) Field of Search ................................. 180/417, 422, 180/425, 439, 442, 441; 74/388 PS; 137/625.46, 625.69; 251/129.11

(56) References Cited

U.S. PATENT DOCUMENTS 3,939,938 * 2/1976 Inoue ................................. 180/79.2
4,264,033 * 4/1981 Kutzner .............................. 236/1 G
4,557,355 * 12/1985 Wilke ................................... 188/173

FOREIGN PATENT DOCUMENTS

| 196 15 543 A1 | 10/1987 | (DE) . |
| 37 14833 A1 | 11/1987 | (DE) . |
| 39 18987 A1 | 12/1989 | (DE) . |
| 43 03 342 A1 | 8/1994 | (DE) . |
| 19541752C2 | 5/1997 | (DE) . |

* cited by examiner

Primary Examiner—Christopher P. Schwartz
Assistant Examiner—C. T. Bartz
(74) Attorney, Agent, or Firm—Crowell & Moring LLP

(57) ABSTRACT

A steering valve arrangement of a hydraulic steering system has a rotary valve with a first and a second control part that are rotationally movable relative to one another. By rotational adjustment of the control parts a hydraulic servomotor is controlled which is connected drivewise with the steered wheels of a vehicle. An electric motor is mounted in a fixed location for actuating the rotary valve relative to the first control part and is connected drivewise with the second control part. The driving connection from the electric motor to the second control part is provided indirectly by a step-down transmission, including a small gear fixed to the motor drive shaft and a large gear connection with the second control part. The steering valve and the motor are disposed side by side and parallel to one another in a compact design.

21 Claims, 2 Drawing Sheets

STEERING VALVE ARRANGEMENT OF A HYDRAULIC STEERING SYSTEM

BACKGROUND AND SUMMARY OF THE INVENTION

The invention relates to a steering valve arrangement of a hydraulic steering system with a rotary valve that has a first and a second control part, said parts being rotationally movable relative to one another, and which controls a hydraulic servomotor connected drivewise with the steered wheels of the vehicle by rotational adjustment of its control parts, and with an electric motor that is located in a fixed position relative to the first control part and which is connected drivewise with the second control part.

A hydraulic steering system especially suitable for operation in a steer-by-wire mode has a steering handle, especially a steering wheel, actuated by a driver. A steering system of this kind also has a hydraulic servomotor which drives steered vehicle wheels connected drivewise therewith for steering. In addition, a steering system of this kind has a steering angle set-value sensor actuated by the steering handle, as well as a steering angle actual-value sensor actuated by the vehicle steered wheels. In order to transmit a steering command issued by the driver in the form of a steering movement of the steering handle to the steering system, i.e. to the steered wheels of the vehicle, a control and regulating device is provided which constantly performs a comparison between the set and actual values of the steering angle and actuates the servomotor accordingly.

To actuate the servomotor, a hydraulic steering system of this kind can have a steering valve arrangement of the type recited at the outset. To control the servomotor, a control and regulating device of the steering system produces, by a corresponding energization of the electric motor, rotational adjustments of the control parts of the rotary valve relative to one another, so that the hydraulic servomotor is pressurized with hydraulic pressure accordingly.

German Patent Document DE 195 41 752 C2 teaches a steering valve arrangement of the type recited at the outset. In this device, a rotary valve is shown that has two control parts that are rotationally movable with respect to one another, said parts being urged into a normal position relative to one another by a spring-elastic torsion rod or torsion bar. An electric motor is integrated into the housing of the rotary valve, with a stator of the electric motor being mounted nonrotatably relative to the first radially external control part of the rotary valve, while a rotor of the electric motor is connected nonrotatably with the second radially inner control part of the rotary valve. Energization of the electric motor produces a corresponding rotational adjustment of the rotor and hence of the second control part relative to the first control part, so that a corresponding hydraulic pressurization of the servomotor results. In order to be able to make rotational adjustments of the control parts of the rotary valve relative to one another against the torsional resistance of the torsion rod, the electric motor used for the purpose must be made relatively large in order to be able to apply the required torque. In addition, a large electric motor of this kind requires a relatively high electrical power, so that firstly the electrical onboard network of a vehicle equipped with such a steering valve arrangement is subjected to severe stress and on the other hand a considerable development of heat in the electric motor is possible which under certain conditions can lead to damage to the electric motor. In addition, a large electric motor requires a relatively large space.

The present invention is concerned with the problem of providing a design for a steering valve arrangement of the type recited at the outset that has a relatively compact design.

This problem is solved according to the invention by a steering valve arrangement of a hydraulic steering system for a vehicle, comprising: a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission.

The invention is based on the general idea of using a relatively small electric motor with a correspondingly small power draw which drives the second control part of the rotary valve through a corresponding transmission. The required high rotary torque is then produced by the transmission ratio of the relatively high rotational speed of the electric motor to the relatively slow rotational adjustments of the control part. A conventional electric motor known as a standard component can be used for the purpose, with a steering valve arrangement according to the invention being especially economical.

Accordingly to an especially advantageous embodiment of the steering valve arrangement according to the invention, the transmission between the electric motor and the control part of the rotary valve driven by it can be designed as a gear drive. A first gear with a smaller outside diameter is connected nonrotatably with a drive shaft of the electric motor and meshes with a second gear with a relatively large outside diameter, connected nonrotatably with the second control part of the rotary valve, driven by the electric motor. The ratio between the outside diameters of the gears defines the transmission ratio.

Preferably, the rotary valve and the electric motor are arranged so that their gears mesh radially. In particular, the gears are each located on the ends of the rotary valve and the electric motor, resulting in a relatively simple design. According to one preferred embodiment, the rotary valve and the electric motor are also located side by side, with the rotary axis of the electric motor and the rotary axis of the rotary valve extending parallel to one another. By this measure, an especially compact design is obtained for the steering valve arrangement including the rotary valve, electric motor, and transmission.

According to one advantageous embodiment of the steering valve arrangement according to the invention, the gear associated with the adjustable control part of the rotary valve can be made as a gear segment that spans an arc of an angle that is as large as the rotational angle between the control parts of the rotary valve in order to move the driven control part from a first end position into a second end position. By this measure, in a limited space, a large outside diameter can be provided for the second gear or a large radius for the gear segment, resulting in a corresponding high transmission ratio.

In one especially advantageous embodiment, an angle sensor can be provided with which the relative positions of the control parts of the rotary valve can be detected. Knowing the relative positions of the control parts with respect to one another makes it possible to realize a number of advantages for the hydraulic steering system equipped with the steering valve arrangement according to the invention. Firstly, under computer control, an arrangement between the differential angles of the control parts and the pressure differential between pressure connections on the servomotor and/or the adjusting speed of the servomotor and/or the steering rate of the vehicle steered wheels can be performed. This arrangement can then be used for refinement, in other words improvement, of the control of the servovalve, in order then to adjust the specified angle provided by the driver to the vehicle steered wheels with the smallest possible regulating expense. Secondly, it is also possible to compensate for manufacturing-related asymmetries in the control behavior of the rotary valve by an appropriate calibration.

One special advantage of using such an angle sensor is achieved in conjunction with a viscosity sensor that senses the viscosity of the hydraulic medium. The viscosity can be determined for example from the temperature of the hydraulic medium using a corresponding temperature sensor. In this manner it is possible to adjust the adjusting angle of the control parts of the rotary valve to the viscosity of the hydraulic medium at the moment in order to be able to obtain the quality of the required high-dynamic adjusting speeds or changes in adjustment angle for the servomotor or the steered wheels of the vehicle.

In the steering valve arrangement according to the invention, it is especially advantageous if the angle sensor directly engages a drive shaft of the electric motor, since in this manner, because of the ratio, the accuracy for determining the adjusting angle of the control parts of the rotary valve is increased. On the other hand, economical angle sensors can be used.

According to one especially advantageous embodiment, a brushless electric motor can be used as the electric motor, which usually has so-called Hall sensors which serve to control the rotary field of the electric motor. However, a signal value can be tapped off from these Hall sensors which correlates with the relative angular position between the rotor and the stator of the electric motor, so that the control contained in such an electric motor can be used as an angle sensor.

An especially compact design can be obtained for the steering valve arrangement if a so-called C-spring is used for pretensioning the control parts into a normal position relative to one another. In addition to the extremely small installation dimensions that are necessary for such a C-spring, the use of a C-spring also has the advantage that the control parts, by contrast with using a torsion bar, are kept under a pretension that can be determined in advance in its normal position.

Additional important features and advantages of the steering valve arrangement according to the invention follow from the subclaims, the drawings, and the associated description of the figures in the drawings.

Of course, the features listed above and explained below can be used not only in the combination described but also in other combinations or alone without going beyond the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
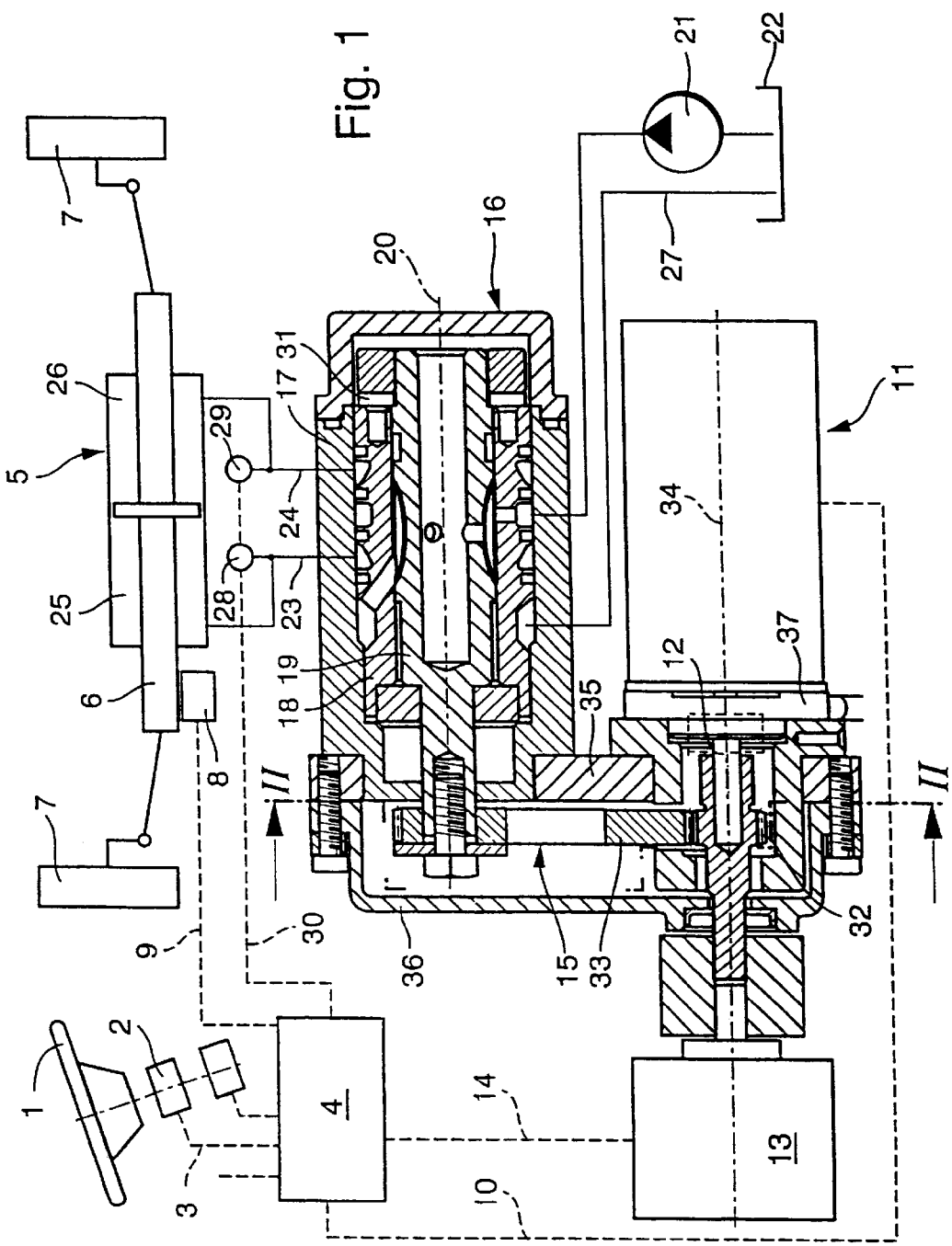
FIG. 1 is a partially sectioned top view of a steering valve arrangement according to the invention with a schematic diagram of an associated hydraulic steering system.

According to FIG. 1, a hydraulic steering system has a steering handle 1 designed as a steering wheel, with which a steering angle set-value sensor 2 is coupled. The steering angle value sensor 2 is actuated by the steering handle 1 and transmits signal values correlating with the desired steering angle set value over a corresponding signal line 3 to a regulating and control device 4. The steering system also has a servomotor 5 designed as a double-acting piston-cylinder assembly, whose piston rod 6 actuates steered wheels 7 of the vehicle for steering. On a part that is adjusted with the steered wheels of the vehicle, in this case on piston rod 6, a steering angle actual value sensor 8 taps off the steering angle currently set for the steered wheels 7 of the vehicle. Through a corresponding signal line 9, a signal value of the regulating and control system 4 that correlates with the actual value of the steering angle is available.

In the regulating and control device 4 a comparison is performed between the set value and actual value of the steering angle and an electric motor 11 is actuated accordingly through a control line 10. By means of a rotary movement of a drive shaft 12 of electric motor 11, firstly an angle sensor 13 coupled directly with the drive shaft 32 is actuated, which passes on a signal value that correlates with the actual angular position of drive shaft 12 relative to a fixed part or housing 37 of electric motor 11, through a signal line 14 to the regulating and control arrangement 4.

Drive shaft 12 of electric motor 11 is also coupled with a servovalve 16 designed as a rotary arrangement through a gear drive 15. This rotary valve 16 has a first control part 18 in a housing 17 and a second control part 19 that are rotatably adjustable with respect to one another. The first control part 18 is connected nonrotatably with housing 17 and is designed in the form of a cylindrical bushing in which the second control part 19 is mounted rotationally adjustably coaxially to a lengthwise or rotational axis 20.

On one side of rotary valve 16, the pressure side of a hydraulic medium pump 21 is connected which is connected on the intake side to a hydraulic medium reservoir 22. On the other hand, rotary valve 16 has two pressure connections 23 and 24 that communicate with matching chambers 25 and 26 of servomotor 5. In addition, rotary valve 16 is connected by a return line 27 with hydraulic medium reservoir 22.

By a greater or lesser rotary adjustment of the second control part 19 in first control part 18 in one direction or the other, one chamber 25 or 26 or the other is connected more or less with the pressure side of the hydraulic medium pump 21, so that piston rod 6, depending on the pressure differential.

Control parts 18 and 19 of rotary valve 16 are pretensioned relative to one another in a normal position with the aid of a C-spring so that control parts 18 and 19 can assume their normal position even in the event of a power failure affecting electric motor 11. The drive shaft 12 of electric motor 11 is pretensioned by a torsion spring supported on the housing 37 of the electric motor 11 into a hydraulic central position that corresponds to the central position of the rotary valve 16. The pressures and/or pressure differentials prevailing in pressure connections 23 and 24 as well as in chambers 25 and 26 are detected by corresponding pressure measuring devices 28 and 29 and consequently matching signal values are transmitted over a corresponding signal line 30 to the regulating and control arrangement 4.

Control parts 18 and 19 of rotary valve 16 are pretensioned relative to one another in a normal position with the aid of a C-spring 31 so that control parts 18 and 19 can assume their normal position even in the event of a power failure affecting electric motor 11.

The gear drive 15 located between electric motor 11 and rotary valve 16 for actuating rotary valve 16 or for rotary adjustment of the second control part 19 has a first gear 32 connected nonrotatably with drive shaft 12 of electric motor 11 and has a relatively small outside diameter. The first gear 32 in gear drive 15 cooperates radially with a second gear 33 that is fastened nonrotatably to the second control part 19 and has an outside diameter (effective diameter) that is large by comparison with the first gear 32. As a result of the choice of a different outside diameter of gears 32 and 33, a desired transmission ratio is obtained whereby on the one hand faster rotational movements of drive shaft 12 around its lengthwise axis 34 are obtained with slower rotational movements of the second control part 19 around its rotational axis 20. On the other hand, the torque that is transmitted through the gear drive 15 to the second control part 19 because of the transmission ratio is so great even with a relatively weak electric motor 11 that the required rotary adjustments against the restoring force of C-spring 31 can be performed easily.

In preferred embodiments of the invention, the first gear 32 has a radius $R_1$ between 3 mm and 20 mm. The radius $R_2$ of the second gear segment 33 is in a preferred range of between 40 mm and 100 mm. The angle a corresponding to the valve control movements of the second gear segment 33 is preferably between 50 and 150. The selection of the values $R_1$, $R_2$, and a should be made to optimize the control for gear segment 33 while accommodating a low power electric motor and facilitating a compact construction. For an especially preferred assembly $R_1=5.3$ mm; $R_2=53.2$ mm; and the angle $\alpha=7°$.

In order for angle sensor 13 to deliver measured values that are as accurate as possible for the relative angular positions of control parts 18 and 19, angle sensor 13 is coupled with drive shaft 12 of electric motor 11 so that here as well, because of the transmission ratio in gear drive 15, the accuracy of the measured values is improved.

As can be seen from FIG. 1, the rotary valve 16 and electric motor 11 are located side by side, with a rotational axis 20 of the second control part 19 extending parallel to the lengthwise axis 34 of drive shaft 12 of electric motor 11. In addition, electric motor 11 is connected nonrotatably by a supporting part 35 with rotary valve 16 or with its housing 17. Gear drive 15 is located at one end of rotary valve 16 and of electric motor 11 and encapsulated by a common cover 36 fastened to supporting part 35. In this manner, gear drive 15 is protected against contamination.

All in all, an especially compact design is obtained for the steering valve arrangement according to the invention, with rotary slide valve 16 and electric motor 11 in the design according to FIG. 1 being combined into an assembly that can be mounted together.

The transmission is designed as a non-self-locking worm gear drive.

Figure 2:
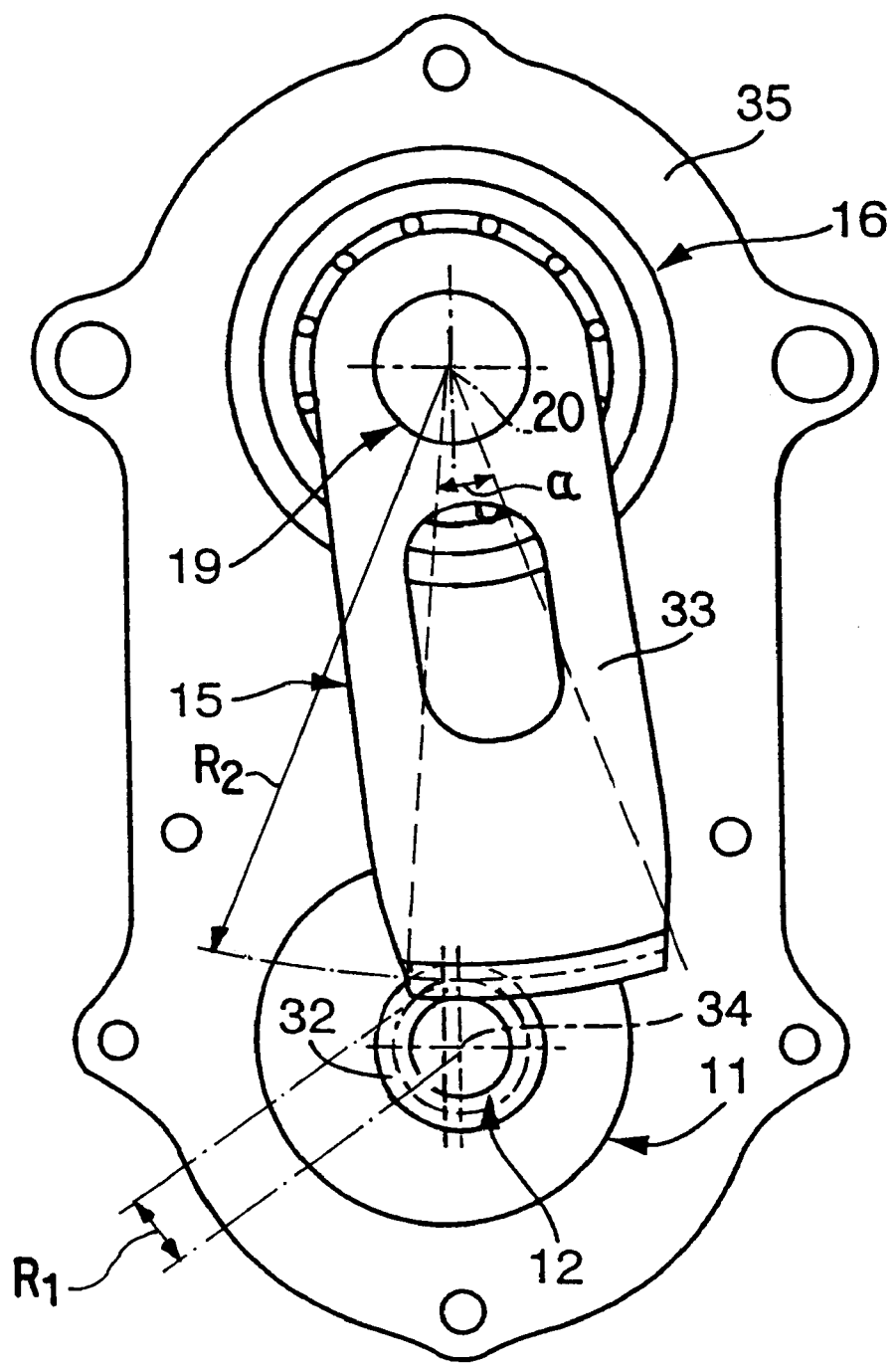
FIG. 2 is a section along section lines II in FIG. 1 through the steering valve arrangement according to the invention.

Since even small rotational adjustments, for example between 5° and 15° are sufficient in order to adjust the second control part 19 from a first relative end position into a second relative end position relative to the first control part 18, the second gear 33 is designed according to FIG. 2 as a gear segment whose angle of arc is chosen to be just large enough that the control parts 18 and 19 can be adjusted relative to one another between the specified end positions. By designing the second gear 33 as a gear segment, gear drive 15 has only small outside dimensions since gear segment 33, within the scope of its maximum adjustment movements, remains inside the contour of the steering valve arrangement shown in FIG. 2. In this manner, the required space for the steering valve arrangement according to the invention is very small. For another thing, the use of the gear segment 33 means that only a relatively small inertial mass must be driven by electric motor 1 in order to adjust control part 19. By this measure, the second control part can be adjusted more rapidly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, wherein the transmission is designed as a gear connection with a first gear with a relatively small outside diameter connected nonrotatably with a drive shaft of the electric motor and a second gear with a relatively large outside diameter being connected nonrotatably with the second control part, and wherein the second gear with the larger outside diameter is designed as a gear segment having an angle of arc equal to a rotational angle between two predetermined end positions of the control parts.

2. Steering valve arrangement according to claim 1, wherein an angle sensor is provided that is connected drivewise with the drive shaft of the electric motor and serves to sense rotary adjustments of the drive shaft of the electric motor.

3. Steering valve arrangement according to claim 1, wherein the electric motor is a brushless electric motor that contains one of an angle detector and a control device that supplies a signal value that correlates with the rotational angle of the drive shaft of the electric motor.

4. Steering valve arrangement according to claim 1, wherein the electric motor and the rotary valve are located side by side, with a rotational axis of the drive shaft of the electric motor and a rotational axis of the control parts of the rotary valve being parallel to one another.

5. Steering valve arrangement according to claim 1, wherein the transmission and connections of the transmission to the second control part and to the electric motor are encapsulated by a common cover.

6. Steering valve arrangement according to claim 1, wherein the gear segment angle of the arc is between 5° and 15°.

7. Steering valve arrangement according to claim 1, wherein the radius of the first gear is between 3 mm and 20 mm, the radius of the second gear segment is between 40 mm and 100 mm, and the angle of arc of the second gear segment is between 50 and 150.

8. Steering valve arrangement according to claim 7, wherein the radius of the first gear is 5.3 mm, the radius of the second gear segment is 53.2 mm, and the angle of arc of the second gear segment is 7°.

9. Steering valve arrangement according to claim 7, wherein the diameter of the second gear segment is at least five times the diameter of the first gear.

10. Steering valve arrangement according to claim 7, wherein the diameter of the second gear segment is approximately ten times the diameter of the first gear.

11. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, and wherein the transmission is designed as a non-self-locking worm gear drive.

12. Steering valve arrangement according to claim 11, wherein the electric motor is a brushless electric motor that contains one of an angle detector and a control device that supplies a signal value that correlates with the rotational angle of the drive shaft of the electric motor.

13. Steering valve arrangement according to claim 11, wherein an angle sensor is provided that is connected drivewise with the drive shaft of the electric motor and serves to sense rotary adjustments of the drive shaft of the electric motor.

14. Steering valve arrangement according to claim 13, wherein the electric motor is a brushless electric motor that contains one of an angle detector and a control device that supplies a signal value that correlates with the rotational angle of the drive shaft of the electric motor.

15. Steering valve arrangement according to claim 14, wherein the electric motor and the rotary valve are located side by side, with a rotational axis of the drive shaft of the electric motor and a rotational axis of the control parts of the rotary valve being parallel to one another.

16. Steering valve arrangement according to claim 11, wherein the transmission and connections of the transmission to the second control part and to the electric motor are encapsulated by a common cover.

17. Steering valve arrangement according to claim 11, wherein the electric motor and the rotary valve are located side by side, with a rotational axis of a drive shaft of the electric motor and a rotational axis of the control parts of the rotary valve being parallel to one another.

18. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, and wherein the control parts of the rotary valve are urged by a C-spring into a hydraulic central position or normal position relative to one another.

19. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, wherein the electric motor and the rotary valve are located side by side, with a rotational axis of a drive shaft of the electric motor and a rotational axis of the control parts of the rotary valve being parallel to one another, wherein the transmission and connections of the transmission to the second control part and to the electric motor are encapsulated by a common cover, and wherein the control parts of the rotary valve are urged by a C-spring into a hydraulic central position or normal position relative to one another.

20. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, and wherein a drive shaft of the electric motor is pretensioned by a torsion spring supported on the housing of the electric motor into a hydraulic central position that corresponds to the central position of the rotary valve.

21. Steering valve arrangement of a hydraulic steering system for a vehicle, comprising:

a rotary valve that has a first and a second control part that are rotationally movable relative to one another, and which, by rotational adjustment of the control parts, controls a hydraulic servomotor connected drivewise with steered wheels of the vehicle, and an electric motor that is located in a fixed position for operating the rotary valve relative to the first control part and is connected drivewise with the second control part, wherein a driving connection between the electric motor and the second control part is provided by a step-down transmission, wherein the electric motor and the rotary valve are located side by side, with a rotational axis of a drive shaft of the electric motor and a rotational axis of the control parts of the rotary valve being parallel to one another, wherein the transmission and connections of the transmission to the second control part and to the electric motor are encapsulated by a common cover, and wherein the drive shaft of the electric motor is pretensioned by a torsion spring supported on the housing of the electric motor into a hydraulic central position that corresponds to the central position of the rotary valve.

* * * * *